United States Patent
Lundquist

Patent Number: 5,322,393
Date of Patent: Jun. 21, 1994

[54] METHOD FOR UNLOADING ORE FROM SHIPS

[76] Inventor: Lynn C. Lundquist, 10833 NE. Russell, Portland, Oreg. 97220

[21] Appl. No.: 91,621

[22] Filed: Jul. 14, 1993

[51] Int. Cl.⁵ ............................................ B65G 53/24
[52] U.S. Cl. ........................................ 406/38; 406/39; 406/151; 406/152
[58] Field of Search ..................... 406/38, 39, 40, 44, 406/106, 151, 152, 197

[56] References Cited

U.S. PATENT DOCUMENTS

| | | | |
|---|---|---|---|
| 289,315 | 11/1883 | Smith | 406/152 X |
| 646,490 | 4/1900 | Deery | 406/151 |
| 2,744,792 | 5/1956 | Finn | 406/152 X |
| 3,542,250 | 11/1970 | McRitchie | 406/39 X |
| 3,758,163 | 9/1973 | Kalisiak | 406/152 X |
| 4,474,327 | 10/1984 | Mattson et al. | 406/38 X |
| 4,973,203 | 11/1990 | Oftedal | 406/152 |

FOREIGN PATENT DOCUMENTS

| | | | |
|---|---|---|---|
| 807554 | 3/1969 | Canada | 406/39 |
| 8720 XI/81e | 12/1955 | Fed. Rep. of Germany | 406/152 |
| 2123249 | 11/1972 | Fed. Rep. of Germany | 406/38 |
| 1066220 | 6/1954 | France | 406/40 |
| 1255426 | 1/1961 | France | 406/39 |
| 75740 | 4/1986 | Japan | 406/38 |
| 8301064 | 10/1984 | Netherlands | 406/39 |
| 8900109 | 8/1990 | Netherlands | 406/39 |
| 628239 | 10/1978 | U.S.S.R. | 406/152 |

*Primary Examiner*—Andres Kashnikow
*Assistant Examiner*—Gary C. Hoge

[57] ABSTRACT

The present invention relates to a process for the removal of ore from the hold of a bulk carrier vessel. The prior art employs a boom mounted vacuum probe which is lowered into the ore material to effect unloading. This invention adds material handling hoses between the boom mounted vacuum probe and wheeled vehicles with attached aspirated suction nozzles. Further, the wheeled vehicles are powered from a stationary hydraulic pumping unit connected to the existing electric power of the boom mounted vacuum probe. Ore unloading efficiency is improved when the ore level in the hold reaches a depth of approximately two feet or less by providing wheeled vehicles carrying aspirated suction nozzles over the decking of the hold.

17 Claims, 3 Drawing Sheets

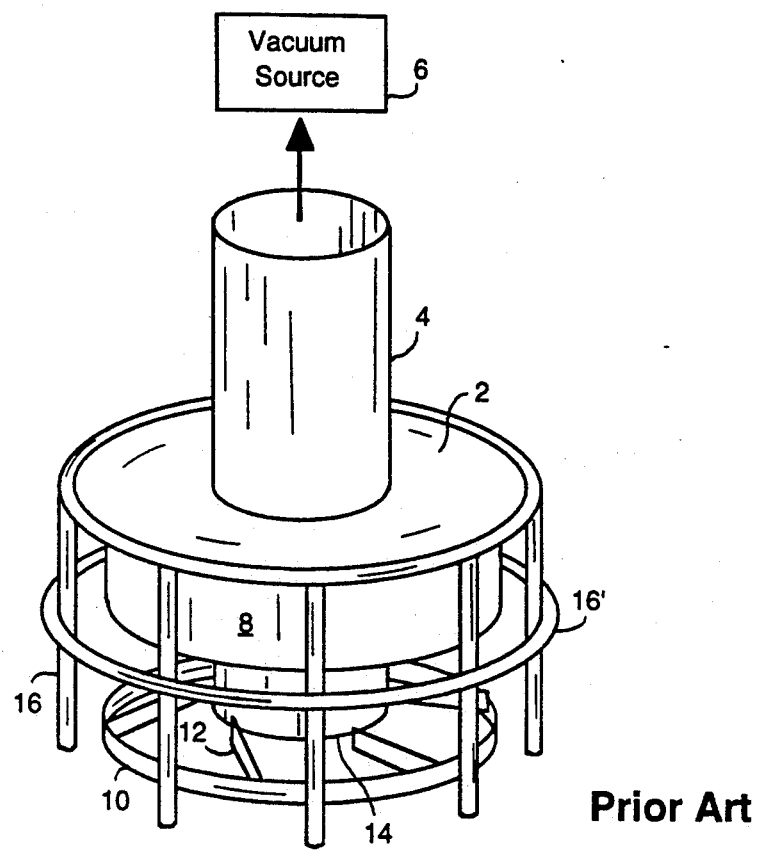
Prior Art
Fig. 1
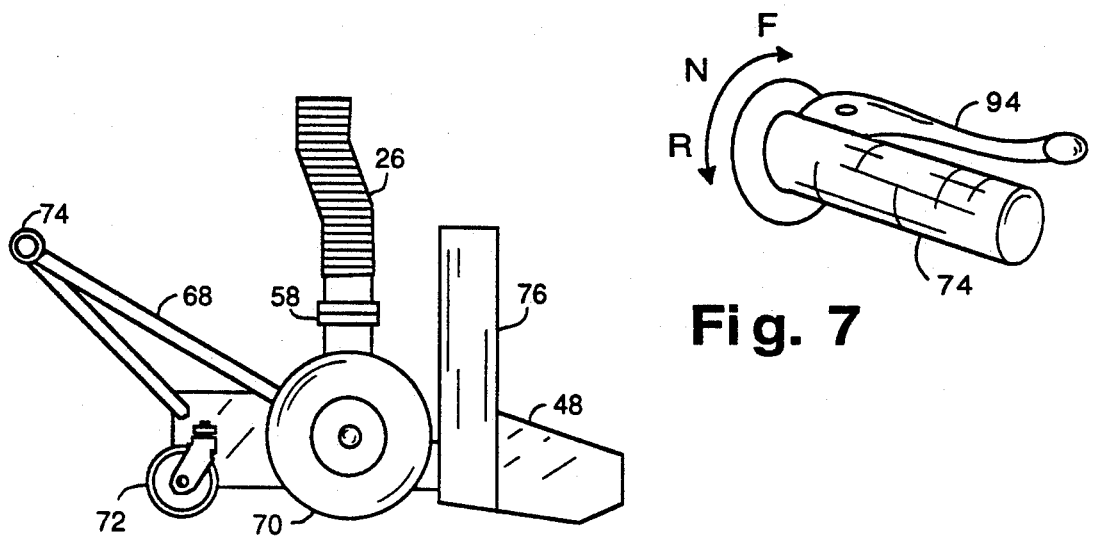
Fig. 3
Fig. 7

METHOD FOR UNLOADING ORE FROM SHIPS

BACKGROUND—FIELD OF THE INVENTION

The present invention relates to a process for the removal of ore from the hold of a bulk carrier vessel. The prior art employs a boom mounted vacuum probe which is lowered into the ore material. This invention improves the prior art by adding wheeled vehicle mounted suction nozzles to the stationary vacuum probe of the prior art.

BACKGROUND—DESCRIPTION OF THE PRIOR ART

The prior art of interest is an ore unloading system manufactured by Alsea Swisse or Switzerland. In the Alsea Swisse design, a vacuum probe is lowered into the ore deposit contained within the bulk carrier vessel's hold. The vacuum probe assembly consists of a vacuum opening which extends into the ore and a rotating paddle which sweeps the ore toward the vacuum probe nozzle.

The Alsea Swisse unit is a highly efficient design when the ore is sufficiently deep to allow the vacuum nozzle to plunge vertically into the ore. Optimum performance of the unloading system is attained when the vacuum nozzle orifice can be entirely submerged into the granular ore. However, as the hold is emptied and the remaining ore in the bottom of the hold is two feet in depth or less, the vacuum nozzle looses efficiency because of its inability to plunge into the shallow depth of the remaining material. In practice, the final stages of unloading the ore vessel are effected by first sweeping the bottom of the bulk carrier vessel's hold with a back-and-forth motion of the vacuum nozzle probe. For the final removal of ore material from the hold, wheeled vehicles with front buckets are lowered into the hold to carry the remaining loose ore to the stationary vacuum nozzle. Wheeled front loaders known as Bobcats (supplied by the Melroe Division of Clark Equipment Company of Fargo, N.D.) are frequently used in this application.

It can be appreciated that the efficiency of the ore removal process is detrimentally effected when the vacuum nozzle probe cannot be plunged into the ore. Further, it can be understood that inefficiency and high maintenance conditions are encountered when internal combustion engine equipment is used in the final stages of removing a highly abrasive ore such as alumina. Considerable operator skill is required when a front loader vehicle is used requiring lifting the material, reversing the direction of the front loader, and subsequently dumping the ore in reach of the vacuum nozzle probe.

OBJECTIVES OF THE INVENTION

This invention was developed with an understanding of the limitations of the present methods used in ore removal from bulk carrier vessels. This new method considers both the improvement of the process used to vacuum the remaining ore from the bottom of the bulk carrier vessel's hold, and the alleviation of high maintenance conditions encountered from the use of aspirated internal combustion engines and front loaders used in the abrasive conditions.

1. It is the general objective of this invention to provide a method whereby the existing vacuum nozzle assembly is employed as the primary power source for the entire ore unloading operation including the final stages of the vessel unloading process.
2. Another objective of this invention is to provide a method whereby aspirated internal combustion engines are not used on moving equipment in the hold.
3. Another objective of this invention is to provide a method whereby wheeled vehicles used in the final ore unloading process move in a substantially constant forward motion to effect the ore delivery to the existing vacuum probe assembly.
4. Another objective of this invention is to provide a method wherein the operator skill level required to manipulate the wheeled vehicles is reduced.
5. Another objective of this invention is to provide a method which reduces the overall equipment expense for the final ore delivery to the existing vacuum probe assembly.
6. Another objective of this invention is to provide a method which increases the load efficiency on the existing vacuum probe assembly during the final stages of the vessel unloading process.
7. Another objective of this invention is to provide a method for efficiently hoisting the required equipment for final ore recovery into the vessel's hold.
8. A final objective of this invention is to increase personnel safety in the vessel's hold by eliminating rapid motion of a front loader vehicle and by reducing exhaust fumes and excessive ore dust in the confined area.

SUMMARY OF THE INVENTION

This invention is a method of more efficiently removing ore from the hold of a bulk carrier vessel after the vacuum probe of the prior art is unable to be plunged into the remaining ore. Further, this invention in its preferred embodiment eliminates the use of mobile equipment powered by an internal combustion engine in the abrasive atmosphere of the ore vessel.

This method employs the vacuum probe of the prior art. At the point at which the vacuum probe can no longer efficiently plunge into the ore remaining on the bottom of the bulk carrier vessel's hold, an enclosure housing is affixed to the vacuum probe which directs the vacuum through at least one external hose connection. Further, in the preferred embodiment, a hydraulic pumping unit is powered from the vacuum probe's electrical equipment whereby remote hydraulic power is available.

At least one wheeled vehicle is provided which has an aspirated suction nozzle connected to the external hose connection by means of a flexible material handling hose. Further, the wheeled vehicle is powered by hydraulic motors connected with suitable hydraulic hoses to the hydraulic pumping unit.

In the preferred embodiment, at least one wheeled vehicle is provided wherein the operator directs the vacuum process from a sitting position on the powered vehicle. The vehicle has forward, reverse, and turning functions controlled by the operator. An aspirated suction nozzle is mounted to the wheeled vehicle in such a way that the operator can control the nozzle position and direction of travel of the wheeled vehicle to achieve a complete vacuuming action of the vessel's hold deck. A substantially long hose connects the vehicle mounted aspirated suction nozzle with the boom vacuum probe.

In a second embodiment, a similar method is employed by using a powered walking wheeled vehicle with an aspirated suction nozzle. In this latter case, the powered unit may have forward, reverse, and turning functions manipulated by handlebar controls. As in the first case, a substantially long hose connects the vehicle mounted suction nozzle with the boom vacuum probe nozzle, and hydraulic power hoses connect a hydraulic power unit to hydraulic motors on the walking wheeled vehicle.

Additional objects and advantages of the invention will become more fully apparent as the description which follows is read in conjunction with the drawings.

BRIEF DESCRIPTION OF THE DRAWINGS

FIG. 1 is a perspective view of the prior art.

FIG. 3 is a side elevation of a powered walking wheeled vehicle.

FIG. 7 is a perspective view of the walking vehicle's hand control.

DETAILED DESCRIPTIONS OF THE PREFERRED EMBODIMENTS

Figure 2:
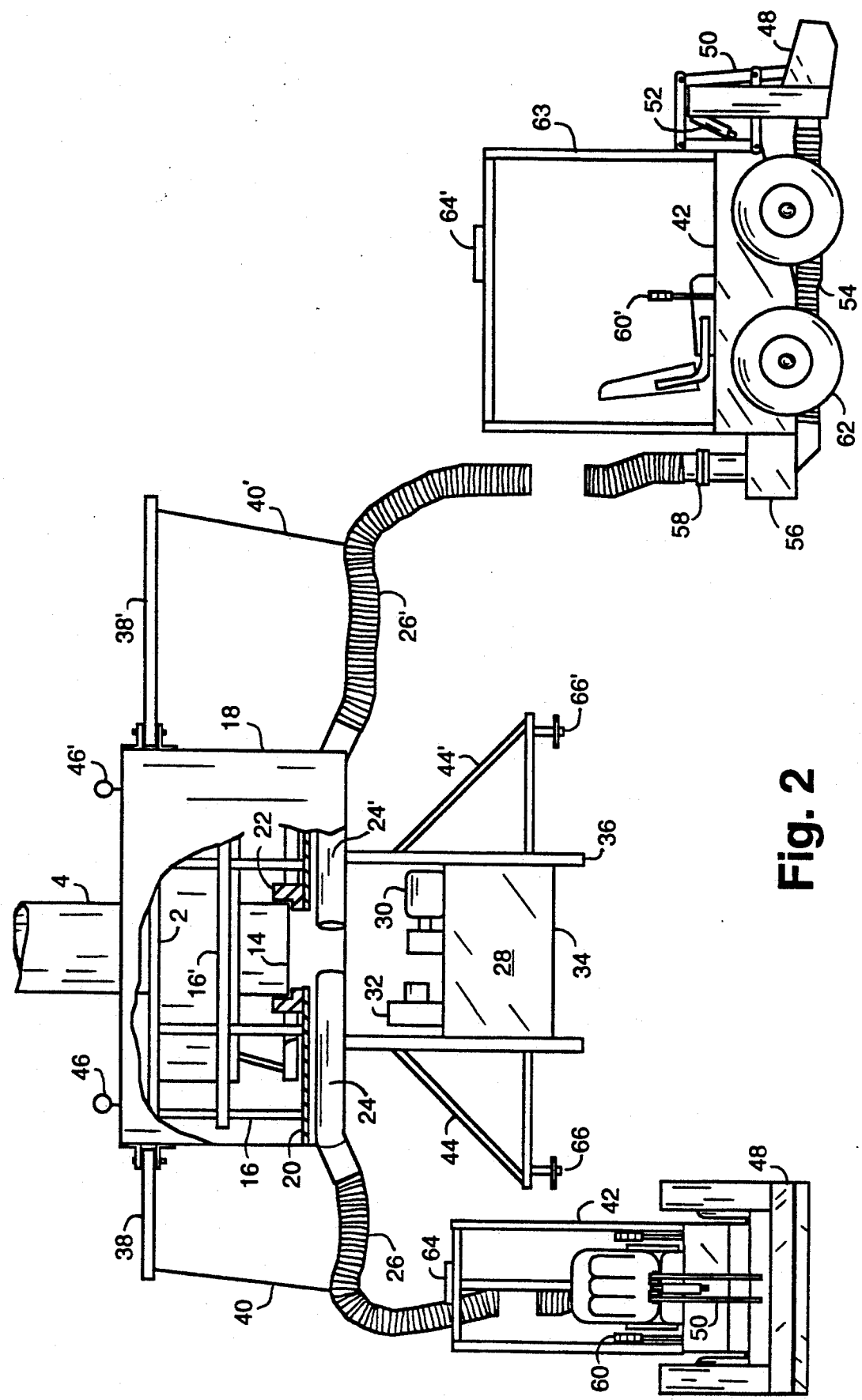
FIG. 2 is a side elevation with a partial cut away section showing two operator ridden wheeled vehicles and a vacuum enclosure housing with a hydraulic pumping unit.

The process of the invention, by way of an overview, generally includes the following steps:
1. Initial unloading of the ore deposits from the hold of a vessel may be achieved with a boom mounted vacuum probe plunged into the ore.
2. At a point at which the ore depth in the vessel's hold prevents efficient use of a plunging technique for further collection of the ore, a wheeled vehicle mounted aspirated suction nozzle tethered to the boom mounted vacuum probe by a material handling hose may be employed through:
   a. Covering the boom vacuum probe nozzle with a housing having material handling hose connections for auxiliary vacuum equipment.
   b. Employing electrical power on the boom to drive a stationary hydraulic pumping unit.
   c. Connecting a wheeled vehicle mounted suction apparatus to the boom vacuum probe nozzle by means of a substantially long and flexible material handling hose.
   d. Providing power for the wheeled vehicle mounted aspirated suction nozzle apparatus from a stationary hydraulic pumping unit by means of hydraulic lines routed with the material handling hose.
   e. Aspirating the ore to aid collection in the wheeled mounted suction nozzle apparatus by directing ambient air underneath the ore mass to be lifted.
3. The wheeled vehicle mounted aspirated suction apparatus may consist of:
   a. a rider carrying vehicle, or,
   b. a vehicle in which the operator walks adjacent to the wheeled vehicle.
4. The stationary hydraulic pumping unit may be powered:
   a. by an electric motor driven hydraulic pump powered from the boom mounted probe unit, or,
   b. by an internal combustion engine driven hydraulic a pump.

To simplify the description, symmetrical parts, multiple parts of a single assembly, or portions of a single part where divided by a sectional view, will be designated with a prime ('). The description of the part(s) having primed reference characters will be limited. Further, to avoid unnecessary detail in both the drawings and specifications, the identification and explanation of construction details which would normally be required for the finished product are omitted if they do not contribute to the understanding of the unique qualities of this device.

FIG. 1 depicts the boom mounted vacuum probe 2 of the prior art. In general, this apparatus consists of a rigid vacuum pipe 4 connected to a shore based vacuum source 6. The entire boom mounted vacuum probe assembly 2 is controlled by stationary mounted equipment from shore and is lowered into the hold of the ship through the vessel's open hold covers. A drive housing 8 contains essential motors and electrical gear. Enclosed in the drive housing 8 is a motor drive for a revolving paddle cage 10 with attached material paddles 12. Central to the boom mounted vacuum probe assembly 2, and projecting from its lower portion, is the vacuum nozzle 14 which is an extension of the rigid vacuum pipe 4. Generally, a cage assembly 16, 16' is incorporated to protect the internal moving equipment and for a support structure when the unit is resting on a deck surface.

In operation, the boom mounted vacuum probe 2 is lowered into the ship's hold and is plunged into the ore to such a depth that the vacuum nozzle 14 is submerged in the ore. The paddle cage 10 rotates at approximately 6 revolutions per minute, causing the material paddles 12 to continuously sweep ore into the high vacuum area adjacent to the vacuum nozzle 14 opening.

FIG. 2 shows the component parts employed in one embodiment of this method. The boom mounted vacuum probe 2 is mounted inside a vacuum unit housing 18. The cage 16, 16' is supported by a housing floor 20 to which a nozzle seal 22 is attached. Thus nested in the seal area, the vacuum nozzle 14 is directly connected to the housing ducts 24, 24' leading to the material handling hoses 26, 26'.

The housing assembly further includes a hydraulic pump unit 28 consisting of a hydraulic pump and motor 30, a hydraulic oil heat exchanger 32, and a hydraulic fluid tank 34. The hydraulic pump unit 28 is connected to the vacuum unit housing 18 by means of a support frame 36 which also serves as the base on which the complete unit rests.

The housing assembly provides material handling hose support arms 38, 38' lanyards 40, 40' to support the weight of the material handling hoses 26, 26' while the riding wheeled vehicle units 42 are operating. A docking frame 44, 44' may be added by which the wheeled vehicles 42 can be attached to the unit for transport into the ship's hold when slung by the attached hoisting eyes 46, 46'.

The riding wheeled vehicle 42 as depicted in FIG. 2 is a four wheel vehicle in which the operator rides during operation. The vehicle is equipped with an aspirated suction nozzle 48 which is mounted to the wheeled vehicle by means of an articulated frame 50 powered by a hydraulic lift cylinder 52. (More detail will be given regarding the construction of the aspirated suction nozzle 48 in the explanation of FIG. 4.) The aspirated suction nozzle 48 is connected to a transition hose 54 which allows movement between the nozzle and the vehicle body. The transition hose 54 connects to a transition box 56 from which the ore is directed to one of the material handling hoses 26, 26'. To allow greater mobility of the riding wheeled vehicle 42, a hose swivel assembly 58 is employed. (The hose swivel assembly will be further explained in the description of FIG. 5.)

Operation of the four wheel drive riding wheeled vehicle 42 is achieved with basic hand controls. A right and left joy stick 60 provide neutral, forward, or reverse rotation for the wheels 62 of a given side. A superstructure frame 63 is used for the dual purpose of operator protection and a frame member to accommodate a docking latch 64, 64' which mates with the docking hangar 66, 66' on the docking frame 44.

FIG. 3 shows a walking wheeled vehicle 68. In this embodiment both the aspirated suction nozzle 48 and the hose swivel assembly 58 are identical to those of the riding wheeled vehicle 42. The walking wheeled vehicle 68 is also powered from the hydraulic pump unit 28 and uses hydraulic motors to power the two drive wheels 70. Two castor wheels 72 are used to stabilize the weight of the walking wheeled vehicle 68. Handle grips 74 are used to control the hydraulic drive functions.

Figure 4:
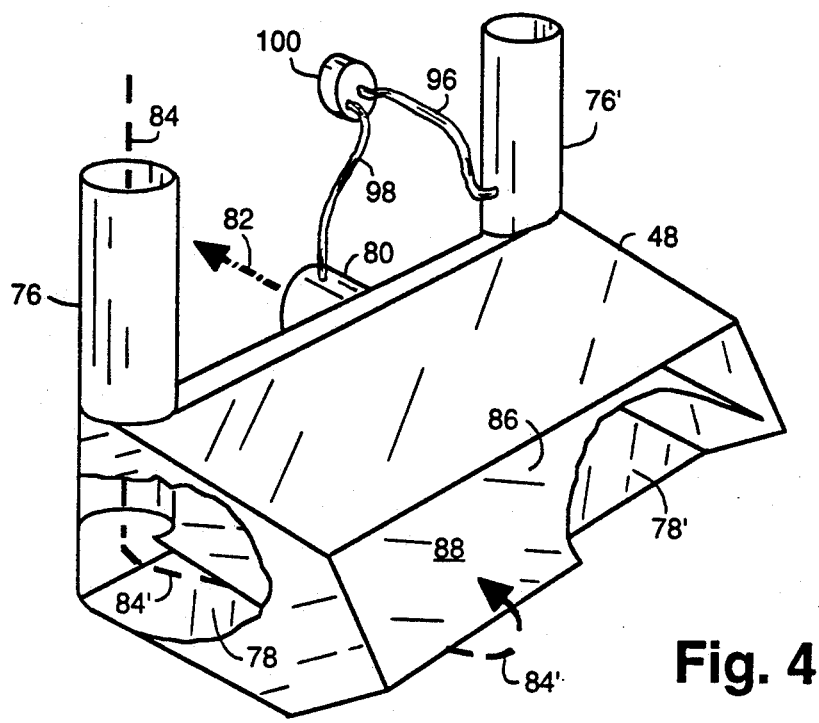
FIG. 4 is a perspective view with a partial cut away section of an aspirated suction nozzle.

FIG. 4 shows the general structure of the aspirated suction nozzle 48. Two air inlet ducts 76 direct ambient air into a lower aspiration chamber 78 of the aspirated suction nozzle 48. With a vacuum source on the outlet duct 80 as indicated by arrow 82, an air flow 84 is established as indicated by the broken line. Ore is drawn into the upper aspiration chamber 86 as the air flow 84 mixes with the ore within a turbulence zone 88.

Figure 5:
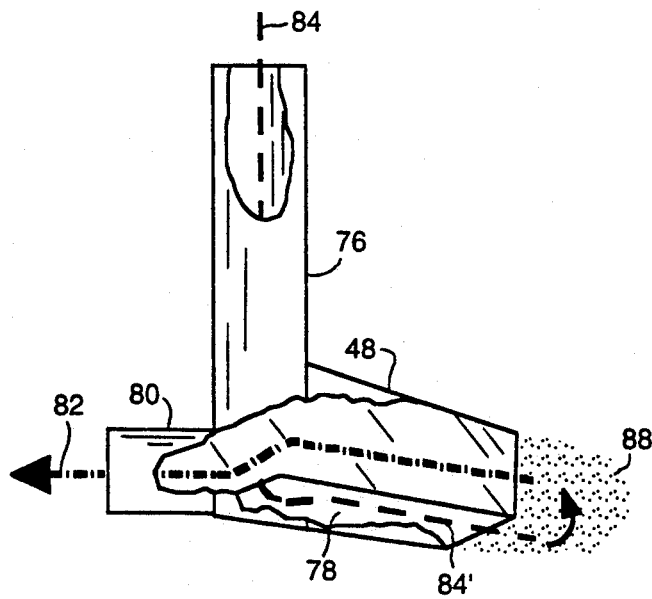
FIG. 5 is a side elevation with a partial cut away section of an aspirated suction nozzle.

FIG. 5 shows the air flow 84 through the aspirated suction nozzle 48. The turbulence zone 88 wherein the air flow 84 mixes with the ore is shown in greater detail. The air entrained ore is conveyed by vacuum into the upper aspiration chamber 86 and discharged through the outlet duct 80 as indicated by arrow 82.

Figure 6:
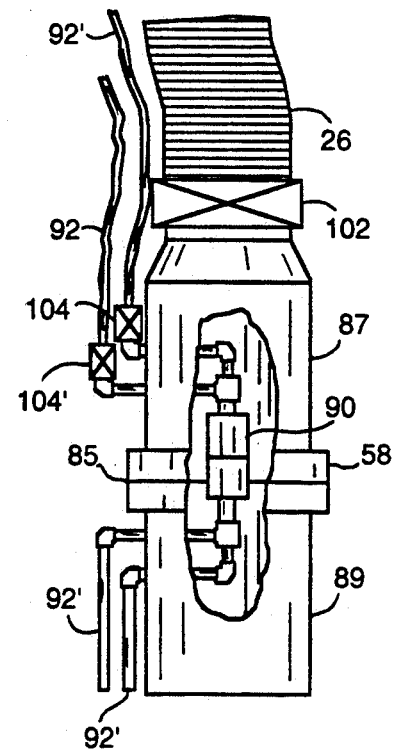
FIG. 6 is a side elevation with a partial cut away section of the material hose and hydraulic hose swivel connection.

FIG. 6 shows the hose swivel assembly 58 in greater detail. The casing joint 85 allows a 360 degree rotation of the upper casing body 87 on the lower casing body 89. A hydraulic line swivel 90 is mounted at the central rotation point of the casing joint 85. The pressure and return hydraulic lines 92 are fed to and from the hydraulic line swivel 90.

FIG. 7 shows the construction of the handle grip 74 control for the walking vehicle 68. The control consists of a twist handle grip 74 with a dead-man lever 94.

OPERATION

This method consists of two embodiments of a vehicle which is utilized for the final ore removal from the hold of a bulk carrier vessel. In a first embodiment, a four wheeled vehicle 42 is employed in which the operator rides within the vehicle. Operator fatigue is reduced by allowing the operator to sit. Further, a joy stick 60 control results in less hand fatigue, and a foot control with provision for raising and lowering the aspirated suction nozzle 48 is possible. The joy stick 60 handle can be locked by detent into a forward position which shifts the forward motion to a regulated speed control valve. Thus, a controlled slow forward speed may be maintained for specific operating conditions. The four wheeled vehicle 42 is maneuvered by independently controlling the driving speed and direction of the paired wheels 62 on each side of the vehicle. The joy stick 60 independently controls the forward, neutral or reverse direction of the wheels on its respective side of the vehicle.

A second embodiment consists of the walking wheeled vehicle 68. This embodiment has the advantage of being more compact and maneuverable in a confined vessel hold area. The handle grip 74 controls of the walking wheeled vehicle 68 control the forward and reverse functions of the vehicle. In order to reduce the hazard of an uncontrolled powered vehicle, a deadman lever 94 must be held for the hydraulic drive to be activated. By twisting the handle to either the forward (F) or reverse (R) position, the corresponding side drive wheel will rotate. Thus, forward, reverse, or turning functions are controlled from the two hand grips. Speed control is determined by the degree of twist given the handle grip 74. To set the vehicle for a pre-regulated forward speed, a flow control valve is adjusted for the desired speed and the two dead-man levers 94 are depressed without twisting the handle grip 74. Twisting the handle grip 74 over rides the pre-regulated forward speed control.

Maneuverability of the walking wheeled vehicle 68 is enhanced by equipping the vehicle with only two drive wheels 70; the turning radius of the vehicle is extremely small since it can be rotated on the center line point of the two drive wheels 70 by reversing one drive wheel while the other drive wheel is in forward drive. The short turning radius is further aided by locating the hose swivel assembly 58 in the center line of the drive wheel axle. The caster wheels 72 follow any turning or direction motion of the vehicle.

The preferred means of powering either vehicle is with a stationary hydraulic pumping unit 28. As indicated in FIG. 6, the hydraulic lines 92 parallel the material handling hose 26. Thus, a high pressure and return line is brought from the stationary hydraulic pumping unit 28 to any wheeled vehicle operating within the system. The stationary hydraulic pumping unit 28 is generally powered with an electric motor, thus eliminating the high maintenance conditions of an aspirated internal combustion engine. In practice, the electrical power used to drive the paddle cage 10 is generally sufficient to drive the electric motor and hydraulic pump 30. Provision is made whereby the electrical power is disconnected from the paddle cage drive and used for the stationary hydraulic unit when the assembly is connected to the boom mounted vacuum probe 2.

An auxiliary diesel engine and hydraulic pump may be mounted on the hydraulic pumping unit 28 as a primary source of power for the wheeled vehicles, or as a secondary power source when the unit is disconnected from the boom mounted vacuum probe 2. When used as a primary power source, combustion air filtration to remove ore abrasives is more simply achieved on a stationary unit than with an engine mounted on the wheeled vehicle. Further, weight and complexity of the wheeled unit is reduced with the use of a stationary hydraulic unit 28 irrespective of its power source. More importantly, however, is the use of the diesel powered hydraulic pump for maneuvering the wheeled units when the stationary hydraulic unit is removed from the boom mounted vacuum probe 2. For safety considerations in the vessel's hold, diesel rather than gasoline is the fuel used for any auxiliary power unit.

In either the case of riding wheeled vehicles 42 or walking wheeled vehicles 68, the vacuum unit housing 18 assembly is identical in function.

Various methods may be employed for raising and lowering the complete unloading assembly into the hold of the vessel. (The complete assembly would include all wheeled vehicles and the entire vacuum unit housing 18 and hydraulic pumping unit 28.) One such method is the use of a docking system wherein docking hangars 66, 66' are locked into docking latches 64, 64' respectively on the wheeled vehicles. The docking system would be constructed so that by hoisting the vacuum unit housing 18 by its hoisting eyes 46, 46', the entire assembly, including the wheeled vehicles, can be lifted and lowered into the vessel's hold. Additionally, the docking system is built so that two riding wheeled vehicles will support the vacuum unit housing 18 and attached hydraulic pumping unit 34 so that the auxiliary diesel pump can be used to power the wheeled vehicles. This arrangement is used to move the unit from the dock to a garage area for storage. This docking system has the further advantage of alleviating the need for individually lowering each unit into the vessel's hold.

In the case of walking wheeled vehicles 68, the docking device does not put the weight of the vacuum unit housing assembly 8 on the vehicles. Nonetheless, provision is made for hoisting the entire unit as an assembly, including the walking wheeled vehicles 68, into the hold of the vessel in a single effort.

At the completion of the normal ore removal operation of the boom mounted vacuum probe assembly 2, the complete unloading assembly as described in this method is lowered into the vessel's hold. Subsequently, the boom mounted vacuum probe is lowered into the open cavity of the vacuum unit housing 18, whereupon appropriate attachment devices are secured and electrical connections made for the electric hydraulic pump motor 30. The vacuum nozzle 14 is nested into the nozzle seal 22 which forms a closed duct system between the vacuum nozzle 14 and the housing ducts 24, 24'. The housing ducts 24, 24' are in turn connected to the respective material handling hoses 26, 26' to complete the material path.

In actual operation, the vacuum unit housing 18 and attached hydraulic pumping unit 28 will be suspended approximately ten to fifteen feet above the working height of the wheeled units. In this way, the material handling hoses 26, 26' will be suspended from the support arms 38, 38' by the lanyards 40, 40' and will drape toward the wheeled vehicles. As the work progresses, the boom mounted unit is repositioned over the work area of the wheeled vehicles.

Particular note should be made of the design and function of the aspirated suction nozzle 48. The nozzle is so constructed that ambient air is drawn into the ore mass within a turbulence zone 88 before the ore is drawn into the upper aspiration chamber 86. This mixing of ore and ambient air in the turbulence zone 88 fluidizes the ore and entrains it in the air stream. The nozzle is constructed so that the turbulence zone 88 is adjacent to the deck. Consequently, when vehicle speed is properly controlled, the cleaning action of the deck will be completed in a single pass. In order to assist the operator control the optimum pick up rate of the aspirated suction nozzle 48, appropriate gages are provided which monitor the nozzle performance as shown in FIG. 4. An air inlet vacuum line 96 is responsive to the air inlet duct 76 vacuum, and an outlet duct vacuum line 98 is responsive to the outlet duct 80 vacuum. The two vacuum lines are routed to a vacuum differential gauge 100 within sight of the operator.

As shown in FIG. 6, provision is made to allow disconnecting of the wheeled vehicle from the hose system. A material handling hose disconnecting means 102 is provided between the material handling hose 26 and the upper casing body 87. On approximately the same plane, each hydraulic hose is equipped with a hydraulic hose disconnecting means 104.

While the present process has been described in conjunction with a preferred embodiment, and variations thereof, it is to be understood that various modifications and other embodiments of the present invention may be made without departing from the scope of the invention as described herein and as claimed in the appended claims.

What I claim is:

1. A method of unloading ore from bulk material vessels wherein a pre-existing vacuum nozzle probe assembly powered by a shore based vacuum source and controlled by shore mounted crane devices is employed to remove ore from the open hold of said bulk material vessel by aspirating said ore, and further, wherein said vacuum nozzle probe assembly is effectively employed when said ore material is of sufficient depth to allow the nozzle proper of said vacuum nozzle probe assembly to plunge into, and be submerged by, said ore, and further, wherein said ore attains a minimum depth within the hold of said vessel insufficient for said nozzle to be submerged by said remaining ore, a method of unloading the remaining ore within said vessel's hold comprising:
    affixing at least one secondary material handling hose to said existing vacuum nozzle probe assembly;
    joining at least one of said secondary material handling hoses to a wheeled vehicle to which an aspirated suction nozzle is affixed; and
    employing said wheeled vehicle with an attached aspirated suction nozzle to remove said remaining ore from said vessel's hold by means of aspiration.

2. The method of claim 1 wherein the operator rides in said wheeled vehicle.

3. The method of claim 1 wherein said wheeled vehicle has four driving wheels.

4. The method of claim 1 wherein the operator walks adjacent to said wheeled vehicle.

5. The method of claim 1 wherein the wheeled vehicle has two driving wheels and at least one castor wheel.

6. The method of claim 1 wherein said wheeled vehicle is powered from a stationary remote hydraulic pumping unit.

7. The method of claim 6 wherein said stationary remote hydraulic pumping unit is powered by an electric motor by means of an electrical connection from said vacuum probe assembly.

8. The method of claim 6 wherein said stationary remote hydraulic pumping unit is powered by an internal combustion engine.

9. The method of claim 1 wherein said aspirated suction nozzle is provided with an air chamber and cooperating air duct passages adjacent to the deck of said vessel's hold.

10. The method of claim 9 wherein said aspirated suction nozzle is provided with a material handling chamber cooperating with a material handling hose which is located above said air chamber of said aspirated suction nozzle.

11. The method of claim 9 wherein an air inlet duct substantially above the level of the ore material conveys air to said lower section of said aspirated suction nozzle.

12. The method of claim 10 wherein a first gage hose cooperates with said air chamber portion of said aspirated suction nozzle and a second gage hose cooperates with said material handling chamber of said aspirated suction nozzle, and further, wherein said first and second gage hoses cooperate with a vacuum differential gage.

13. The method of claim 1 wherein said aspirated suction nozzle is affixed to said wheeled vehicle including a hydraulic cylinder which causes said aspirated suction nozzle to be selectively vertically positioned independently of said wheeled vehicle frame.

14. The method of claim 6 wherein a vacuum unit housing and said stationary remote hydraulic pumping unit comprise a single assembly.

15. The method of claim 6 wherein a first docking means is attached to said vacuum unit housing and a second docking means is attached to said wheeled vehicle so that said wheeled vehicle and said vacuum unit housing are joined and lowered into said vessel's hold as an assembly.

16. The method of claim 6 wherein said existing vacuum nozzle probe assembly is selectively affixed to said vacuum unit housing.

17. The method of claim 1 wherein a swivel means allowing unrestricted axial rotation is interposed between said material handling hose and said wheeled vehicle.

* * * * *